(12) United States Patent
Jabusch et al.

(10) Patent No.: US 10,870,410 B2
(45) Date of Patent: Dec. 22, 2020

(54) SEAT INTEGRATED BELT STRUCTURE WITH LOAD TAKING FRAME

(71) Applicant: AUTOLIV DEVELOPMENT AB, Vargarda (DE)

(72) Inventors: Ronald Jabusch, Elmshorn (DE); Gunter Clute, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 1 day.

(21) Appl. No.: 16/173,078

(22) Filed: Oct. 29, 2018

(65) Prior Publication Data

US 2020/0047710 A1 Feb. 13, 2020

(30) Foreign Application Priority Data

Aug. 8, 2018 (DE) .................. 10 2018 213 279

(51) Int. Cl.
*B60R 22/46* (2006.01)
*B60R 22/40* (2006.01)
*B60N 2/68* (2006.01)
*B60R 22/34* (2006.01)

(52) U.S. Cl.
CPC .......... *B60R 22/4604* (2013.01); *B60N 2/688* (2013.01); *B60R 22/4628* (2013.01); *B60R 2022/3402* (2013.01)

(58) Field of Classification Search
CPC ..... B60N 2/688; B60N 2/2821; B60N 2/2887
See application file for complete search history.

(56) References Cited

U.S. PATENT DOCUMENTS

| 4,568,106 | A | * | 2/1986 | Yokoyama | B60R 22/26 280/802 |
|---|---|---|---|---|---|
| 4,749,231 | A | * | 6/1988 | Cremer | B60N 2/686 297/468 |
| 5,253,924 | A | * | 10/1993 | Glance | B60N 2/688 297/216.13 |
| 5,697,670 | A | * | 12/1997 | Husted | B60N 2/4221 297/216.13 |
| 6,637,772 | B1 | | 10/2003 | Fagerhag et al. | |
| 6,737,819 | B2 | * | 5/2004 | Tanji | B60R 22/44 180/268 |
| 8,944,206 | B2 | * | 2/2015 | Odate | B60R 22/44 180/268 |
| 2002/0130545 | A1 | * | 9/2002 | Tanji | B60R 22/44 297/480 |
| 2002/0140278 | A1 | * | 10/2002 | Hlavaty | B60R 22/4619 297/464 |
| 2004/0021029 | A1 | | 2/2004 | Eberle et al. | |
| 2005/0264059 | A1 | * | 12/2005 | Clement | B60N 2/2806 297/238 |
| 2005/0284977 | A1 | | 12/2005 | Specht et al. | |
| 2007/0085397 | A1 | * | 4/2007 | Tanaka | B60N 2/688 297/354.12 |
| 2008/0246316 | A1 | * | 10/2008 | Carine | B60N 2/2806 297/216.11 |
| 2009/0146487 | A1 | * | 6/2009 | Becker | B60N 2/688 297/483 |

(Continued)

*Primary Examiner* — Shin H Kim
(74) *Attorney, Agent, or Firm* — Dickinson Wright PLLC

(57) ABSTRACT

The invention refers to a load-bearing structural part (2) of a seat structure of a vehicle seat, which has a cavity (21), in which a belt retractor (40) is arranged.

15 Claims, 4 Drawing Sheets

(56) References Cited

U.S. PATENT DOCUMENTS

Figure 1A:
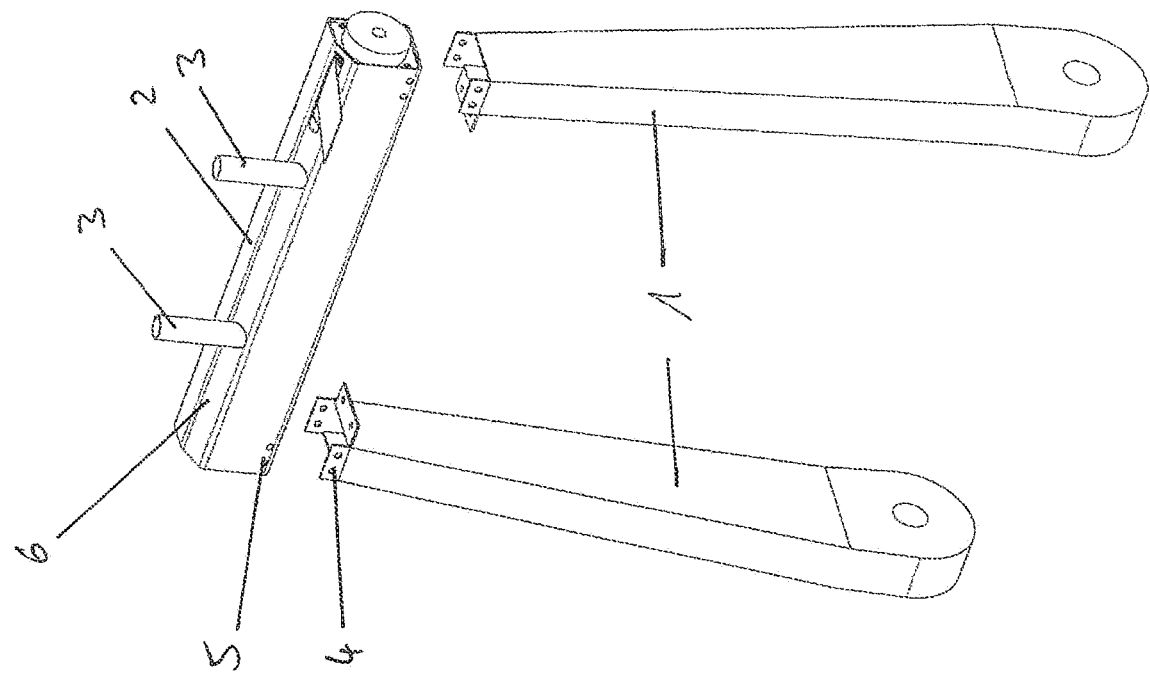

| | | | |
|---|---|---|---|
| 2010/0001503 A1* | 1/2010 | Tanaka | B60R 22/03 280/807 |
| 2010/0176649 A1* | 7/2010 | Kohama | B60R 22/1955 297/474 |
| 2010/0187885 A1* | 7/2010 | Yamada | B60N 2/062 297/344.1 |
| 2010/0244542 A1* | 9/2010 | Sealy | B60R 22/4628 297/480 |
| 2011/0147509 A1 | 6/2011 | Wang et al. | |
| 2012/0248846 A1* | 10/2012 | Titz | B60R 22/20 297/473 |
| 2014/0103696 A1* | 4/2014 | Odate | B60R 22/03 297/469 |
| 2015/0158590 A1* | 6/2015 | Gehret | B60R 22/1952 297/474 |
| 2016/0082922 A1* | 3/2016 | Yoon | B60R 22/36 242/374 |
| 2017/0050612 A1 | 2/2017 | Ford | |

* cited by examiner

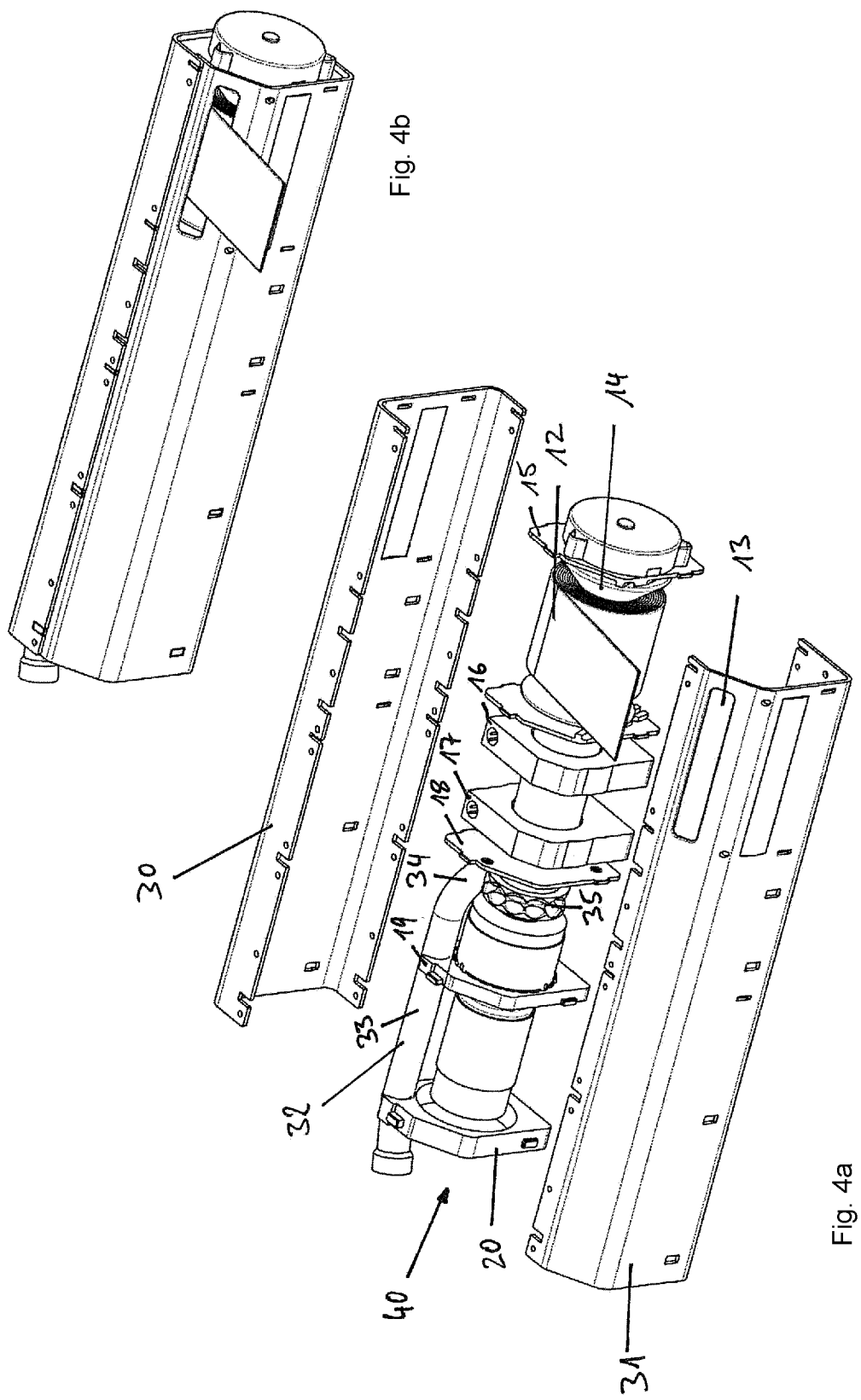

SEAT INTEGRATED BELT STRUCTURE WITH LOAD TAKING FRAME

CROSS-REFERENCE TO RELATED APPLICATIONS

This application claims the benefit of priority under 35 U.S.C. § 119 to German Patent Application No. 10 2018 213 279.8, filed Aug. 8, 2018, the contents of which are incorporated herein by reference in their entirety.

FIELD OF THE INVENTION

The present invention relates to a load-bearing structural part for a motor vehicle seat.

BACKGROUND

Seats for vehicles with integrally mounted seat belt devices are known, for example in the use as front seats in convertibles, in which at least the belt retractor of the seat belt means are fixed in the backrests of the vehicle seats. The belt retractors are preferably integrated in this case, due to the lack of a load-bearing B-column and due to the access to the rear seats or due to the distance to the rear vehicle structure, in the backrest of the vehicle seats, which are thus also designed to absorb the traction forces acting in the case of a restraining action. The belt retractors themselves are identical in their basic structure to standard belt retractors and are provided only with different additional assemblies which are specifically provided for installation in the backrest, such as a self-aligning inertial sensor.

The basic components of belt retractors are a load-bearing frame and a belt reel rotatably mounted in the frame, on which a seat belt can be wound up. The frame is used in addition to the support of the belt reel also for fastening the belt retractor to the seat structure and is made for this purpose from a correspondingly thick steel sheet, which is bent into a U-shaped frame.

The vehicle seat in its basic structure is composed of a plurality of load-bearing structural parts, which are used for fixing the vehicle seat to the vehicle structure. The seat structure is provided with springs and a padding to improve the sitting comfort, and also serves for fastening further components such as various seat adjustment mechanisms, including the associated electric motors and other components such as heaters, sensors, displays, head rests and the like.

In modern vehicles with autonomous driving systems an increased adjustability of the vehicle seats in various orientations and positions is increasingly required to provide the occupant with the freedoms gained by the autonomous driving, such as for performing a deeper communication with the other passengers, for example, and more intense periods of rest or for work and for aligning the vehicle seat accordingly. This has the consequence that the seat belt device and in particular the belt retractor no longer has to be attached to the vehicle structure as before, but instead to the vehicle seat, as was already the case, for example, in the front seats of convertibles.

Against this background, the invention has the object, to allow the most space-saving and dimensionally stable attachment possible of a belt retractor to a vehicle seat.

To achieve this object, a load-bearing structural part for a vehicle seat with the characteristics described herein proposed.

SUMMARY AND INTRODUCTORY DESCRIPTION OF THE INVENTION

According to a feature of embodiments of the invention, a load-bearing structural part is proposed, which has a cavity in which the belt retractor is arranged. By the proposed solution, the belt retractor can be arranged in a space-saving way on the vehicle seat, or the vehicle seat can be made correspondingly compact in relation to the arrangement of the belt retractor. For this purpose, one of the structural parts is specifically provided with a cavity for receiving the belt retractor, wherein the cavity may be adapted, with respect to shape and position, in a targeted way, to the external shape of the belt retractor and to its function, for example, with regard to the lead-out of the seat belt. In this case, the load-bearing structural part can also replace the hitherto required frame of the belt retractor, in that the belt reel of the belt retractor is mounted directly on the load-bearing structural part or on a part which is fixedly connected thereto. Furthermore, the tensile forces occurring in case of restraint can now be directly transmitted to the structural part, wherein the load-bearing structural part can be designed, due to the shape of the cavity, in a targeted way, for absorbing the restraining forces. Since the structural part of the seat structure is already designed to absorb seat forces and other forces acting on the vehicle seat, this already has a sufficiently high strength, which is also used by the proposed solution for receiving the restraint forces exerted by the seat belt. Furthermore, the load-bearing structural part has a particularly high torsional and bending stiffness due to the cavity and thus the three-dimensional design with angled walls, which in turn is advantageous for the load absorption and the retention of the occupant in case of an accident.

It is further proposed that the cavity has an opening through which a belt which can be wound up on the belt retractor is led out. The opening serves to lead out the seat belt and can also be used for installation, wherein, in the latter case, additionally an insert part may be provided, which reduces the opening after the installation of the belt retractor.

It is further proposed that the load-bearing structural part is formed by a housing in the form of a cross-sectionally U-shaped, one-sided open profile rail with two opposite legs, extending from a base surface, and that the cavity is formed by the space between the opposite legs. The first advantage of the proposed solution is the fact that the structural part may be very inexpensively prefabricated as multiple formed part or can be obtained as a semi-finished product. Secondly, the U-shaped profile rail has, due to the free side between the legs, a very large access opening. Moreover, the profile rail has three large abutment and attachment surfaces formed by the inner sides of the legs and the base surface. In addition, the U-shaped profile rail has a great torsional and bending stiffness, which is due to its shape, and which is advantageous for absorbing the forces acting in the case of restraint.

It is also proposed that the legs of the profile rail have a different height from the base surface. Due to the proposed further development, the opening width of the opening in the profile rail can be increased, in that, the distance between the edge sides of the legs is increased by the different height compared to the distance of the edge sides, with an identical height.

It is further proposed that the leg with the smaller height in the intended installation position of the structural part faces a seat surface of the vehicle seat. Due to the proposed further development, the enlarged opening of the seat surface thus faces the side of the occupant to be restrained, to which the seat belt is also led out. Thus, the belt retractor can be arranged in the cavity such that it is protected by one of the legs protruding therebeyond on one side, while the seat belt can be led out tangentially from the belt retractor over the leg with the lower height.

It is further proposed that the belt retractor is mounted in a web supported between the legs of the profile rail. The web can be used in addition to supporting the belt retractor also for a stiffening of the profile rail in that the web prevents the two legs from bending with acting forces. For example restraint loads acting on the belt retractor can be restrained by the web with its connection to the profile rail. The web itself is shaped, dimensioned and arranged in the profile rail in a particular way with respect to its actual function for supporting the belt shaft. Furthermore, the web can also serve to accommodate other functional parts, such as sensors, actuators or blocking devices. The webs can then also be understood as functional walls.

It is further proposed that at least a second web which is supported between the legs of the profile rail is provided which is spaced apart from the first web. By the second web, the deformation stiffness of the legs in the movement to each other and the torsional rigidity of the profile rail and thus the dimensional stability of the structural part in the case of restraint can be improved. In addition, the second web can be used for further supporting of the belt retractor and/or for supporting further assemblies cooperating with the belt retractor.

It is further proposed that the belt retractor has a belt reel rotatably mounted about an axis of rotation, and the belt retractor is arranged such that the axis of rotation of the belt reel is aligned parallel to the longitudinal direction of the profile rail. Thus, a particularly compact and space-saving arrangement of the belt retractor may be achieved. If the webs are aligned perpendicular to the profile rail, the support can be particularly easily realized in that the axis of rotation of the belt reel of the belt retractor is therefore also perpendicular to the supporting webs.

It is further proposed that the seat structure includes two parallel and spaced apart extending longitudinal struts which extend in a generally vertical longitudinal direction of a portion of the seat structure forming a backrest, and that the load-bearing structural part with the cavity and the belt retractor arranged therein connects the two longitudinal struts at their ends to each other to form a stable edge side of the backrest. Thus, the structural part and the longitudinal struts form a three-sided, stable frame of the backrest, which serves to support the upper body of the occupant and is used by the inventive solution, in addition to receiving the retaining forces in case of an accident.

It is also proposed that the load-bearing structural part is arranged such that the cavity is open to the outside of the vehicle seat. Due to the proposed alignment of the structural part, the seat belt wound up on the belt retractor can be guided in a simplified manner from the vehicle seat to the occupant seated thereon.

The structural part may be preferably formed of a metal sheet, so that it is inexpensive to manufacture by a plastic bending and forming process in a high-volume series production process, and secondly it is made of a sufficiently stable material with respect to the requirements of the retention of the occupant.

Alternatively, the structural part may also be formed from a fiber reinforced plastic part. Modern fiber-reinforced plastics such as GRP or CFRP have a high strength similar to metal or steel, but are significantly lighter. In addition, they can easily be produced in complex shapes in corresponding molds, and this eliminates a correspondingly complex post-processing.

It is further proposed that the structural part has at least in the region of the cavity one or more stiffening ribs. By the stiffening ribs, the deformation resistance of the structural part may be efficiently increased only with a slightly higher weight of the structural part. The ribs can be simply formed by thickenings on the surface, for example by deposition welding or printing, or they may divide the cavity of the structural part also wall-like in different sections by extending from a wall of the cavity to an opposite wall of the cavity.

The invention will hereinafter be explained with reference to preferred embodiments with reference to the accompanying figures.

Figure 2:
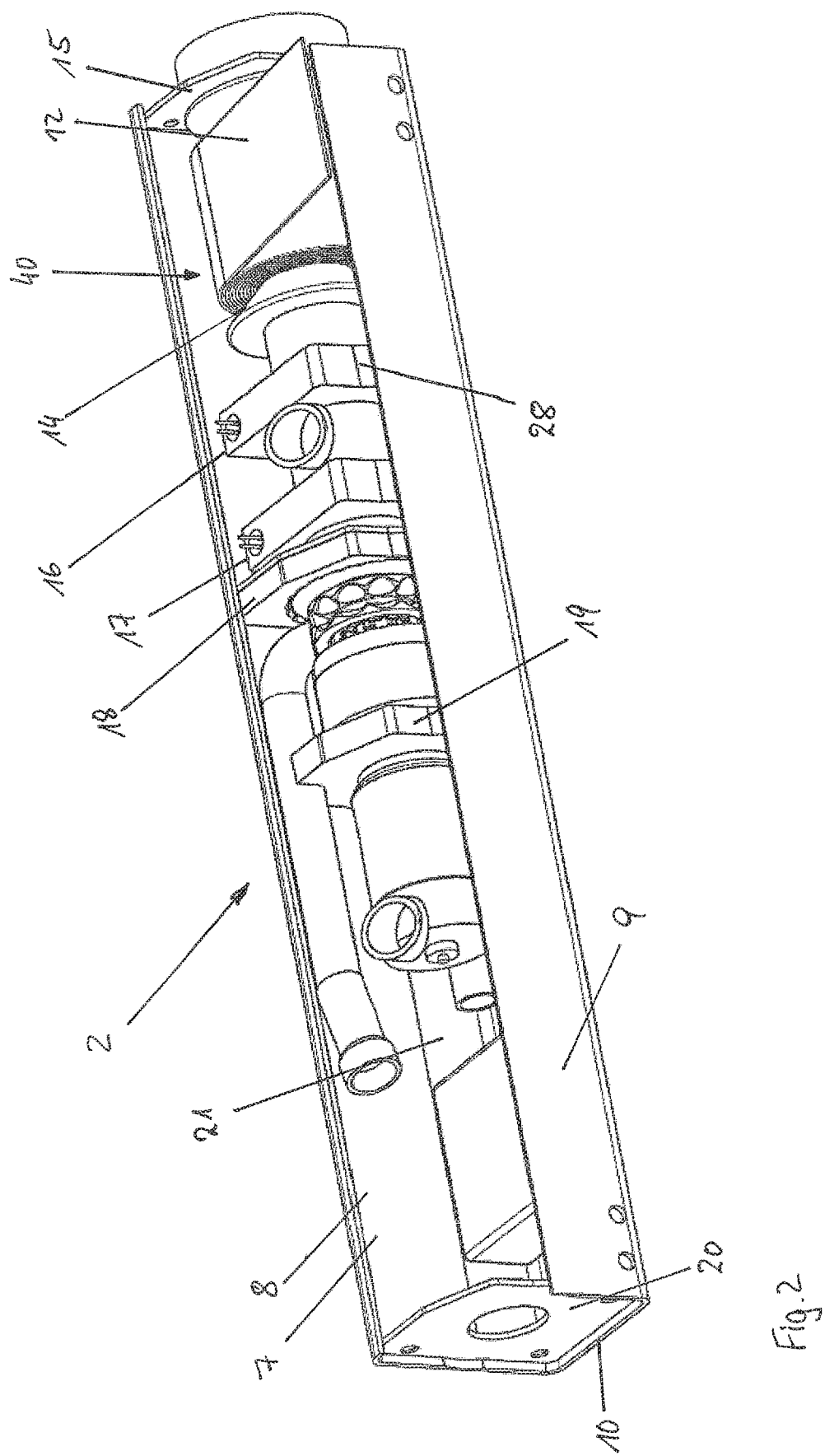
Figure 3:
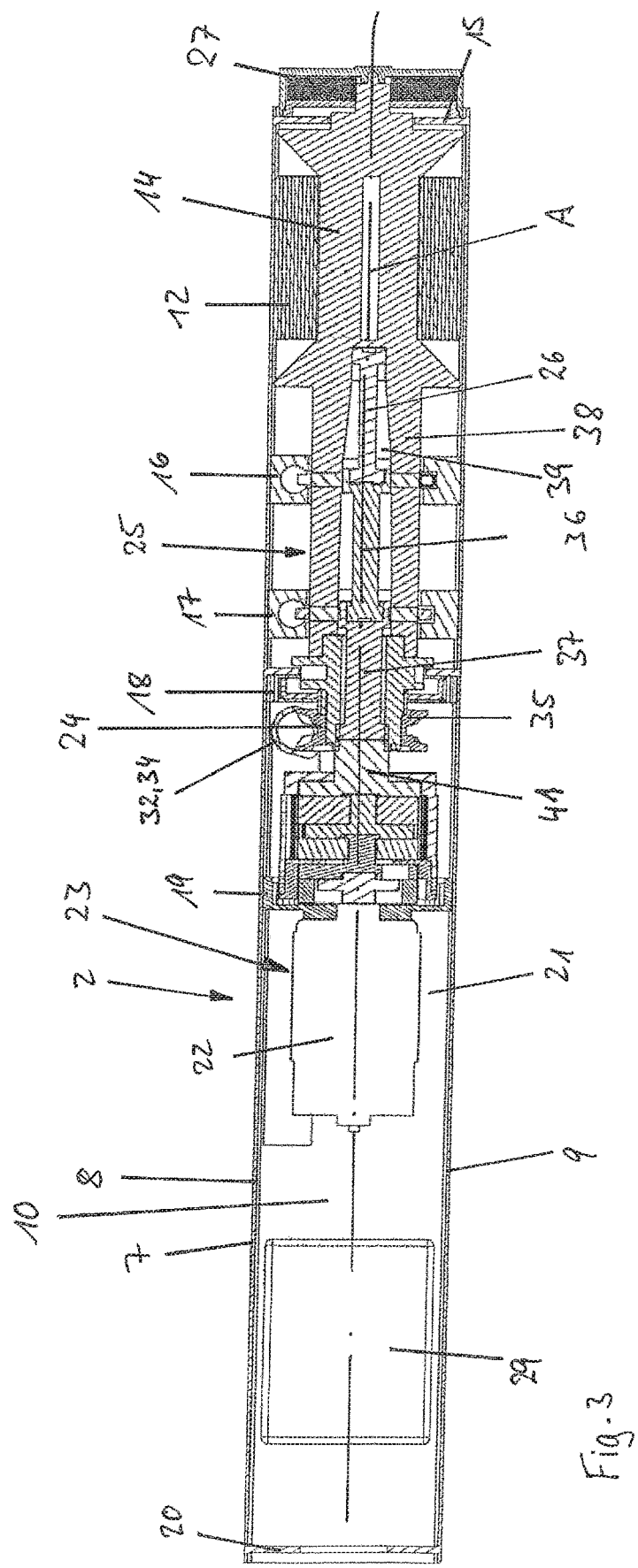

FIGS. 1a and b show two longitudinal struts of a vehicle seat with a load-bearing structural part according to the invention; and FIG. 2 shows the load-bearing structural part having a cavity and a belt retractor disposed therein; and FIG. 3 shows a sectional view of the load-bearing structural part with the cavity and the belt retractor disposed therein; and FIGS. 4a and b show the load-bearing structural part in a second embodiment.

DETAILED DESCRIPTION

FIGS. 1a and b show part of a seat structure of a vehicle seat for a motor vehicle, which forms the backrest of the vehicle seat. The seat structure forms the dimensionally stable "core" of the vehicle seat and is additionally provided with springs and/or padding to improve the seating comfort. Further, on the seat structure further functional components such as seat adjustment mechanisms, a headrest, electronic devices such as displays, or heating are provided.

The seat structure is a composite of a plurality of load-bearing structural parts 2, of which two are formed by mutually parallel generally vertically extending longitudinal struts 1. The upper ends of the longitudinal struts 1 are connected to one another by load-bearing structural part 2 in accordance with the present invention to form a dimensionally stable top of the backrest. For connecting the longitudinal struts 1 upstanding tabs 4 with fastening openings are provided thereon, and on the structural part 2 fastening openings are also provided, through which the parts are connected to each other either by screws or rivets.

In FIG. 2, the load-bearing structural part 2 is shown in an enlarged view, as a single part. The load-bearing structural part 2 has as a basic component housing in the form of a profile rail 7 having a U-shaped cross-section, with a base surface 10 and two opposite wall-shaped legs 8 and 9 extending parallel to one another and projecting from the base surface 10. The profile rail 7 has an opening 28 formed between the edge sides of the legs 8 and 9, which is closed by an insert part 6 shown in FIGS. 1a and b that was omitted from FIG. 2 for simplifying the structural part 2. The insert part 6 is formed by a plate having a form adapted to the shape of the aperture 28 and has a slot 13 through which a seat belt 12 described in more detail below is guided from a cavity 21 between the legs 8 and 9 to the outside onto a restrained occupant sitting on the vehicle seat. The insert part 6 closes or reduces the opening 28 except for the slot 13, so that the cavity 21 is closed to the outside, and a belt retractor 40 provided therein is protected against mechanical effects. The end faces of the profile rail 7 are each closed by a web 15 and 20.

In the cavity 21 of the load-bearing structural part 2 the belt retractor 40 is arranged with a belt reel 14 and the seat belt 12 wound thereon, which can be seen in the FIG. 3 in sectional view. The belt retractor 40 has, in addition to the belt reel 14, a force limiting device 25 with a plurality of torsion bars 26, a pyrotechnic irreversible belt tensioner 24 and a reversible electromotive belt tensioner 23 in a coaxial arrangement with respect to the axis of rotation of the belt reel 14. The outer dimensions of the belt reel 14 with the seat belt 12 wound thereon to a maximum extent, and the outer dimensions of the force limiting device 25, the pyrotechnic belt tensioner 24 and the electromotive belt tensioner 23 are selected in the cross-sectional area perpendicular to the axis of rotation of the belt reel 14 so that they are not greater than the dimensions of the cavity 21 perpendicular to the longitudinal extension of the profile rail 7, so that they can be arranged in the cavity 21 of the profile rail 7.

In the profile rail 7 a plurality of webs 15, 16, 17, 18, 19 and 20 are provided in the form of wall sections perpendicular to the longitudinal extension of the profile rail 7, which extends from one of the legs 8 or 9 to the other leg 8 or 9 and are connected to these. Further, the webs 15, 16, 17, 18, 19 and 20 may extend to the base surface 10 of the profile rail 7 and thus fill the entire cross-sectional area of the profile rail 7. The webs 15, 16, 17, 18, 19 and 20 each have one or more openings or lugs in which the belt retractor or parts thereof such as the belt reel 14 are supported, attached and/or are passed through. Further, for example, one of the webs 15, 16, 17, 18, 19 and 20 may also have a toothing or other blocking design, in which the belt reel 14 or other parts of the belt retractor can be locked together to transmit loads such as torsional loads imposed by restraint forces acting on one or more of the restraint devices such as the belt reel 14, the force limiting device 25, the pyrotechnic irreversible belt tensioner 24 and the reversible electromotive belt tensioner 23. In addition, the webs 15, 16, 17, 18, 19 and 20 may also have additional cavities for receiving further components of the belt retractor such as pyrotechnic propellant charges for the pyrotechnic belt tensioner 24, electronic components such as sensors, electronic control units or support units. If the webs 15, 16, 17, 18, 19 and 20 extend from one of the legs 8 or 9 to the other leg 8 or 9, the webs 15, 16, 17, 18, 19 and 20 may be additionally used for the stiffening of the profile rail 7, which in turn is advantageous for the load capacity and the dimensional stability of the profile rail 7 in the case of restraining of the occupant. The components of the belt retractor are deliberately coaxial and arranged one behind the other, so that the assembly deliberately has smaller radial dimensions and thus can be arranged in a narrow elongated cavity 21 of the profile rail 7. Thereby, the profile rail 7 and the load-bearing structural part can be formed correspondingly narrow and elongated, as is particularly advantageous for the use of the load-bearing structural part according to the invention in a seat structure of the vehicle seat.

In FIG. 3, the load-bearing structural part according to the invention can be seen in section through the profile rail 7 and the belt retractor. The profile rail 7 which has a U-shaped cross-section has the legs 8 and 9 facing the viewer in this illustration and a base surface 10. Between the legs 8 and 9, the cavity 21 is provided, in which the belt retractor is arranged. The cavity 21 is divided by six webs 15, 16, 17, 18, 19 and 20, wherein the two outer webs 15 and 20 close the cavity 21 to the outside at the two ends of the profile rail 7.

At the right leg 15, a spring cartridge having a drive spring 27 is held, which in turn is connected to the belt reel 14 and thereby biases the belt reel 14 in the winding direction of the seat belt 12 wound thereon. The belt reel 14 is provided at its end projecting into the profile rail 7 with a force limiting device 25 which is formed by tubular extension 38 coaxial with the belt reel 14, three series arranged torsion bars 26, 36 and 37 and a lockable blocking part 41, which is non-rotatable relative to the profile rail 7. In the present embodiment, three torsion bars 26, 36 and 37 are provided, which are each connected indirectly or directly rotatably at one end to the belt reel 14 or with the tubular extension 38 and which may be blocked in a non rotatable way or released with the respective other end through a switching device provided in a respective web 16 or 17, relative to the profile rail 7. Thus, the torsion bars 26, 36 and 37 can be activated individually or in combination, whereby the restraining forces can be realized at different force limitation levels or according to a stepped force limitation curve. The blocking part 41 may be lockable by a vehicle-sensitive and/or belt-sensitive controllable blocking device in the extension direction of the seat belt 12, whereby the force limiting device 25 is blocked, so that it is automatically activated when exceeding the force limit level defined by the force limiting device 25. Further, a pyrotechnic, irreversible belt tensioner 24 is provided with a drive wheel 35 coaxially arranged relative to the belt reel 14 which drives the belt reel 14 in case of an activation via an intermediate clutch in the winding direction and tightens the seat belt 12. In addition, a reversible belt tensioner 23 is provided with an electric motor 22 which drives the belt reel 14 in case of an activation via a second clutch or the same coupling as the pyrotechnic belt tensioner 24 in the winding direction and thereby tightens the seat belt 12. The electric motor 22 is also arranged coaxially with the belt reel 14 and thus also with the force limiting device 25 and with the pyrotechnic belt tensioner 24. Further, an electronic control unit 29 is provided in the profile rail 7 of the load-bearing structural part 2, which can serve to control the belt retractor 40 and/or other components. The load-bearing structural part 2 is a basic component of the seat structure in that it connects further parts of the seat structure, such as the longitudinal struts 1 in FIG. 1. The structural part 2 thus has the task of forming the seat structure and serves through the intended cavity 21 in addition for receiving the belt retractor 40. The load-bearing structural part 2 can be preassembled as an assembly with the belt retractor 40 and may then be completely mounted as a unit during the manufacture of the seat structure or the vehicle seat.

The profile rail 7 forms the basic component of the load-bearing structural part 2 and is shaped and dimensioned according to the connection to be realized of the other structural parts in the seat structure. The profile rail 7 can replace the previously required frame of the belt retractor 40, in that it provides both the support of the belt retractor 40 and the securing of the belt retractor 40 to the vehicle seat.

The belt retractor 40 is formed in a modular manner with the belt reel 14 and the other subassemblies, namely the force limiting device 25, the pyrotechnic belt tensioner 24 and the reversible belt tensioner 23 in a coaxial series arrangement. In this case, the assemblies are deliberately designed so that their radial outer dimensions do not protrude beyond the dimension of the belt reel on the belt reel 14 when the seat belt 12 is wound up to the maximum, as can be seen in FIG. 3. The maximum outer diameter of the belt retractor 40 is thus predetermined by the diameter of the belt winding when the seat belt 12 is wound to a maximum. Since the belt winding is circular in cross-section, and the cavity 21 in the profile rail 7 or the housing in the FIG. 4 has a square cross-section, among the maximum dimensions, which are dictated by the belt winding, also a cavity has to be considered, which has a square cross-section with side lengths, which correspond to the diameter of the belt winding or are slightly larger.

The webs 15, 16, 17, 18, 19 and 20 can be considered, in addition to their support function additionally or alternatively as functional walls, by the provision of appropriate seats and an arrangement of different functional units in or on the seats. In order to fulfill their bearing function, the webs 15, 16, 17, 18, 19 and 20 are preferably supported non-rotationally (i.e. fixed against rotational movement) between the legs 8 and 9 and the base surface 10 of the profile rail 7 or between the housing parts 30 and 31 in FIG. 4.

The alternative exemplary embodiment in FIGS. 4a and b thus differs from the exemplary embodiment of FIG. 3 in that the belt retractor 40 is provided, instead of a housing in the form of a profile rail 7, with a two-part housing with two housing parts 30 and 31. The housing parts 30 and 31 are each U-shaped and house the belt reel 14 and the other assemblies, including the webs 15, 16, 17, 18, 19 and 20 in the mounted position to the outside, as in the upper right representation of the FIG. 4. The housing parts 30 and 31 form in the assembled position an elongated cavity 21 with a quadrangular cross-section. Since the belt reel 14 with the seat belt 12 wound thereon and the other modules have a generally circular cross-section, an oblong free space, having an approximately triangular cross-section is provided between the nip of the belt reel 14, the assemblies and the housing in the respective corners, which may be used for arranging the tensioner drive tube 32. The tensioner tube 32 serves to guide a drive device, such as a chain of loosely adjacent mass bodies, or an elastic drive train, which is accelerated upon activation of the pyrotechnic belt tensioner and thereby brought into drive connection with the drive wheel 35. The drive wheel 35 and the belt reel are thereby driven subsequently in order to perform a rotational movement in the winding direction of the seat belt 12. The tensioner tube 32 has a linear portion 33 and a curvature portion 34 and is oriented and arranged in order to be aligned with the linear portion 33 parallel to the axis of rotation of the belt reel 14 and the drive wheel 35 and with the curvature portion 34 tangent to the outer circumference of the drive gear 35. The curvature portion 34 is curved exclusively in one plane, so that the curvature portion 34 and the linear portion 33 are arranged in a plane which runs parallel to the axis of rotation of the belt reel 14 in the mounted arrangement of the tensioner tube 32.

Figure 1B:
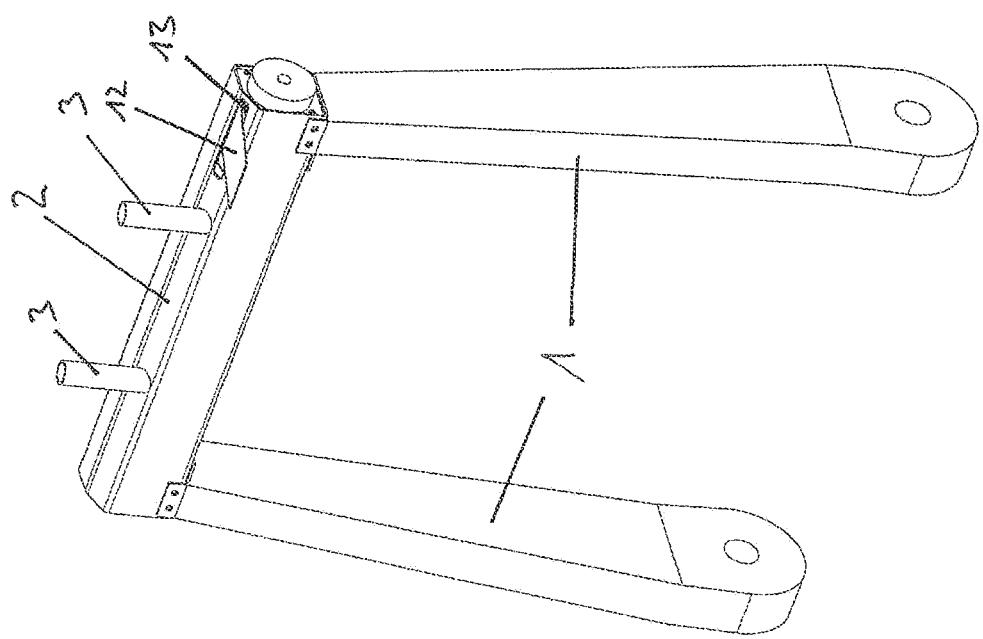

The housing parts 30 and 31 form in the assembled position with the belt retractor 40 disposed therein a dimensionally stable housing, which can be used as the load-bearing structural part in the seat structure, which is shown in FIG. 1. The load-bearing structural part 2 with the profile rail 7 or the housing parts 30 and 31 has been described in FIGS. 1a and b with a horizontal mounting geometry, which has advantages in terms of horizontal alignment of the seat belt 12 when the belt is fed to the occupant. A horizontal orientation of the seat belt 12 in the feeding direction relative to the occupant is advantageous in that the seat belt 12 can thus be guided horizontally on the occupant's shoulder without being deflected again or twisted. Alternatively, however, the load-bearing structural part 2 can also be arranged in a vertical or oblique orientation on the seat structure. The seat belt 12 is then fed in an oblique orientation or deflected by use of a separate deflection unit in the intended direction of feed to the occupant. Furthermore, the structural part 2 can also be arranged at a lower point or on one side of the seat structure of the backrest instead of at an upper edge of the backrest, as long as the seat structure or the feeding of the seat belt 12 requires and/or allows this. Instead of the profile rail 7 or the housing parts 30 and 31, it would also be conceivable to provide a tubular structural part 2 with a circular or other cross-section, in which the belt retractor 40 is arranged and is inserted in particular from the front side.

While the above description constitutes the preferred embodiment of the present invention, it will be appreciated that the invention is susceptible to modification, variation and change without departing from the proper scope and fair meaning of the accompanying claims.

The invention claimed is:

1. A load-bearing structural part of a seat structure of a vehicle seat, comprising, the structural part has a cavity in which a seatbelt retractor is arranged, the seatbelt retractor including a belt reel having a seatbelt wound thereon and at least one additional subcomponent, the at least one additional subcomponent comprising at least one of, a load limiting device, an irreversible belt tensioner, and a reversible belt tensioner, each of the at least one additional subcomponent and the belt reel aligned in a coaxial manner relative to an axis of rotation of the belt reel and enclosed with the belt reel within the cavity.

2. The load-bearing structural part according to claim 1, further comprising, the cavity has an opening through which the seatbelt wound on the belt reel is led out.

3. The load-bearing structural part according to claim 1 further comprising, the structural part is formed from one metal sheet piece.

4. The load-bearing structural part according to claim 1 further comprising, the structural part is formed from a fiber-reinforced plastic part.

5. The load-bearing structural part according to claim 1 further comprising, the structural part has one or more stiffening webs at least in the region of the cavity.

6. The load-bearing structural part according to claim 2 further comprising, the opening is closed by an insert part to enclose the seatbelt retractor within the cavity.

7. The load-bearing structural part according to claim 1 further comprising, the load-bearing structural part forms a top of a seat backrest.

8. The load-bearing structural part according to claim 5 further comprising, the one or more stiffening webs are placed between the belt reel and the at least one additional subcomponent.

9. The load-bearing structural part according to claim 1 further comprising, the seatbelt retractor belt reel is rotatably mounted about a rotation axis of the belt reel, and the seatbelt retractor is arranged such that the axis of the belt reel is aligned parallel to the longitudinal direction of a profile rail.

10. A load-bearing structural part of a seat structure of a vehicle seat, comprising,
   the structural part has a cavity in which a seatbelt retractor is arranged,
   the load-bearing structural part comprises a cross-sectionally U-shaped, one-sided open profile rail with first and second opposite legs, extending from a base surface, and
   the cavity is formed by a space between the opposite legs.

11. The load-bearing structural part according to claim 10, further comprising, the first and the second legs of the profile rail have different heights from the base surface.

12. The load-bearing structural part according to claim 11, further comprising, one of the first and the second legs with a relatively smaller height in the intended installation position of the structural part is facing a seat surface of the vehicle seat.

13. The load-bearing structural part according to 10 further comprising, the seatbelt retractor is mounted in a first web which is supported between the first and the second legs of the profile rail.

14. The load-bearing structural part according to claim 13, further comprising, at least a second web is supported between the first and the second legs of the profile rail, which is spaced from the first web.

15. The load-bearing structural part according claim 10 further comprising, the seatbelt retractor has a belt reel rotatably mounted about the rotation axis of the belt reel, and the seatbelt retractor is arranged such that the rotation axis of the belt reel is aligned parallel to the longitudinal direction of the profile rail.

* * * * *